US009665099B1

(12) United States Patent
Saunders et al.

(10) Patent No.: US 9,665,099 B1
(45) Date of Patent: May 30, 2017

(54) INTEGRATED VALVE FOR A LEGGED ROBOT

(71) Applicant: Google Inc., Mountain View, CA (US)

(72) Inventors: John Aaron Saunders, Arlington, MA (US); Malik Hansen, Waltham, MA (US); Jan Komsta, Waltham, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/985,796

(22) Filed: Dec. 31, 2015

(51) Int. Cl.
*G05D 1/02* (2006.01)
*A63H 11/00* (2006.01)

(52) U.S. Cl.
CPC .......... *G05D 1/021* (2013.01); *A63H 11/00* (2013.01); *Y10S 901/01* (2013.01)

(58) Field of Classification Search
CPC ... Y10T 137/86654; B25J 9/144; F15B 11/05; F15B 11/00
See application file for complete search history.

(56) References Cited

U.S. PATENT DOCUMENTS

| 3,774,634 | A | 11/1973 | Bonney |
| 4,140,953 | A | 2/1979 | Dunne |
| 4,216,702 | A | 8/1980 | Brundidge et al. |
| 4,800,924 | A | 1/1989 | Johnson |
| 4,838,145 | A | 6/1989 | Slocum et al. |
| 5,020,417 | A | 6/1991 | Weyer |
| 5,467,800 | A | 11/1995 | Sallas |
| 5,954,093 | A | 9/1999 | Leonard |
| 6,269,838 | B1 | 8/2001 | Woodworth et al. |
| 6,390,228 | B2 * | 5/2002 | Serizawa ............... B62D 5/062 137/625.23 |
| 6,594,992 | B1 * | 7/2003 | Naito ..................... F15B 11/17 137/625.17 |
| 7,735,517 | B2 | 6/2010 | Kerckhove et al. |
| 8,126,592 | B2 * | 2/2012 | Saunders ................ B25J 9/144 700/245 |

* cited by examiner

*Primary Examiner* — Craig Schneider
*Assistant Examiner* — Kevin Barss
(74) *Attorney, Agent, or Firm* — McDonnell Boehnen Hulbert & Berghoff LLP

(57) ABSTRACT

An example valve includes: a sleeve having a plurality of sleeve openings; a first conduit configured to be in hydraulic communication with a first chamber, where a first pressure sensor is disposed in the first conduit and configured to measure a pressure level of fluid in the first chamber; a second conduit configured to be in hydraulic communication with a second chamber, where a second pressure sensor is disposed in the second conduit and configured to measure a pressure level of fluid in the second chamber; a spool rotatable within the sleeve, wherein the spool includes a plurality of spool openings respectively corresponding to the plurality of sleeve openings; a rotary actuator coupled to the spool and configured to rotate the spool within the sleeve in clockwise and counter-clockwise directions; and a controller configured to cause the spool to rotate to one of a plurality of rotary positions.

5 Claims, 13 Drawing Sheets

INTEGRATED VALVE FOR A LEGGED ROBOT

BACKGROUND

An example robot may have a plurality of members composing the robot's legs and arms. Motion of these members may be controlled by hydraulic actuators such as hydraulic cylinders and motors. Hydraulic valves control hydraulic fluid flow to and from these actuators.

SUMMARY

The present disclosure describes implementations that relate to an integrated valve for a legged robot. In a first example implementation, the present disclosure describes a rotary valve. The rotary valve includes a sleeve having a plurality of sleeve openings, where the plurality of sleeve openings include at least: a first opening configured to communicate fluid to and from a high pressure fluid source, a second opening configured to communicate fluid to and from a low pressure fluid reservoir, a third opening configured to communicate fluid to and from a first chamber of a hydraulic actuator, and a fourth opening configured to communicate fluid to and from a second chamber of the hydraulic actuator. The rotary valve also includes a first conduit configured to be in hydraulic communication with the first chamber, where a first pressure sensor is disposed in the first conduit and configured to measure a pressure level of fluid in the first chamber. The rotary valve further includes a second conduit configured to be in hydraulic communication with the second chamber, where a second pressure sensor is disposed in the second conduit and configured to measure a pressure level of fluid in the second chamber. The rotary valve also includes a spool rotatable within the sleeve, where the spool includes a plurality of spool openings respectively corresponding to the plurality of sleeve openings. The rotary valve further includes a rotary actuator coupled to the spool and configured to rotate the spool within the sleeve in clockwise and counter-clockwise directions. The rotary valve also includes a controller configured to perform operations comprising: (i) receiving, from the first pressure sensor and the second pressure sensor, pressure information indicative of the pressure level in the first chamber and the pressure level in the second chamber, respectively, and (ii) based on the pressure information, providing a signal to the rotary actuator to rotate the spool to one of a plurality of rotary positions, where, at each rotary position, a subset of the plurality of spool openings is at least partially aligned with a subset of the plurality of sleeve openings, to hydraulically connect (a) the first chamber to either the high pressure fluid source or the low pressure fluid reservoir, and (b) the second chamber to either the high pressure fluid source or the low pressure fluid reservoir.

In a second example implementation, the present disclosure describes a robot. The robot includes at least one movable member; a hydraulic actuator coupled to the movable member and configured to control motion of the movable member, where the motion of the movable member include one or more of position, speed, and force of the movable member; and a rotary valve configured to control hydraulic fluid flow to and from the hydraulic actuator. The rotary valve includes a sleeve having a plurality of sleeve openings, where the plurality of sleeve openings include at least: a first opening configured to communicate fluid to and from a high pressure fluid source, a second opening configured to communicate fluid to and from a low pressure fluid reservoir, a third opening configured to communicate fluid to and from a first chamber of the hydraulic actuator, and a fourth opening configured to communicate fluid to and from a second chamber of the hydraulic actuator. The rotary valve also includes a first conduit configured to be in hydraulic communication with the first chamber, where a first pressure sensor is disposed in the first conduit and configured to measure a pressure level of fluid in the first chamber. The rotary valve further includes a second conduit configured to be in hydraulic communication with the second chamber, where a second pressure sensor is disposed in the second conduit and configured to measure a pressure level of fluid in the second chamber. The rotary valve also includes a spool rotatable within the sleeve, wherein the spool includes a plurality of spool openings respectively corresponding to the plurality of sleeve openings. The rotary valve further includes a rotary actuator coupled to the spool and configured to rotate the spool within the sleeve in clockwise and counter-clockwise directions. The rotary valve also includes a controller configured to perform the following operations: (i) determining one or more desired motion characteristics for the movable member, (ii) receiving, from the first pressure sensor and the second pressure sensor, pressure information indicative of the pressure level in the first chamber and the pressure level in the second chamber, respectively, and (iii) based on the one or more desired motion characteristics and the pressure information, providing a signal to the rotary actuator to rotate the spool to one of a plurality of rotary positions, where, at each rotary position, a subset of the plurality of spool openings is at least partially aligned with a subset of the plurality of sleeve openings, to hydraulically connect (a) the first chamber to either the high pressure fluid source or the low pressure fluid reservoir, and (b) the second chamber to either the high pressure fluid source or the low pressure fluid reservoir In a third example implementation, the present disclosure describes performing the following operations: (i) determining one or more desired motion characteristics for a movable member of a robot, where a hydraulic actuator is coupled to the movable member and configured to control motion of the movable member, where the motion of the movable member include one or more of position, speed, and force of the movable member, where the movable member is coupled to a base, or another member, of the robot by way of a joint, where a joint rotary position sensor is coupled to the joint and configured to provide joint rotary position information, and where a rotary valve is configured to control hydraulic fluid flow to and from the hydraulic actuator, the rotary valve comprising: (a) a sleeve having a plurality of sleeve openings, (b) a first conduit configured to be in hydraulic communication with a first chamber of the hydraulic actuator, where a first pressure sensor is disposed in the first conduit and configured to measure a pressure level of fluid in the first chamber of the hydraulic actuator, (c) a second conduit configured to be in hydraulic communication with a second chamber of the hydraulic actuator, where a second pressure sensor is disposed in the second conduit and configured to measure a pressure level of fluid in the second chamber, (d) a spool rotatable within the sleeve, where the spool includes a plurality of spool openings respectively corresponding to the plurality of sleeve openings, (e) a rotary actuator coupled to the spool and configured to rotate the spool within the sleeve in clockwise and counter-clockwise directions, and (f) a rotary position sensor configured to provide spool rotary position information indicative of a rotary position of the spool within the sleeve; (ii) receiving: (a) from the first pressure sensor and the second pressure sensor, pressure information indicative of the pressure level in the first chamber and the pressure level in the second chamber, respectively, (b) from the joint rotary position sensor, the joint rotary position information, and (c) from the rotary position sensor, the spool rotary position information; and (iii) based on the one or more desired motion characteristics, the pressure information, the joint rotary position information, and the spool rotary position information, providing a signal to the rotary actuator to rotate the spool to one of a plurality of rotary positions, where, at each rotary position, a subset of the plurality of spool openings is at least partially aligned with a subset of the plurality of sleeve openings.

In a fourth example implementation, the present disclosure describes a non-transitory computer readable medium having stored therein instructions that, when executed by a computing device, cause the computing device to perform operations in accordance with the third example implementation.

A fifth example implementation may include a system having means for performing operations in accordance with the third example implementation.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Robotic Systems

Figure 1:
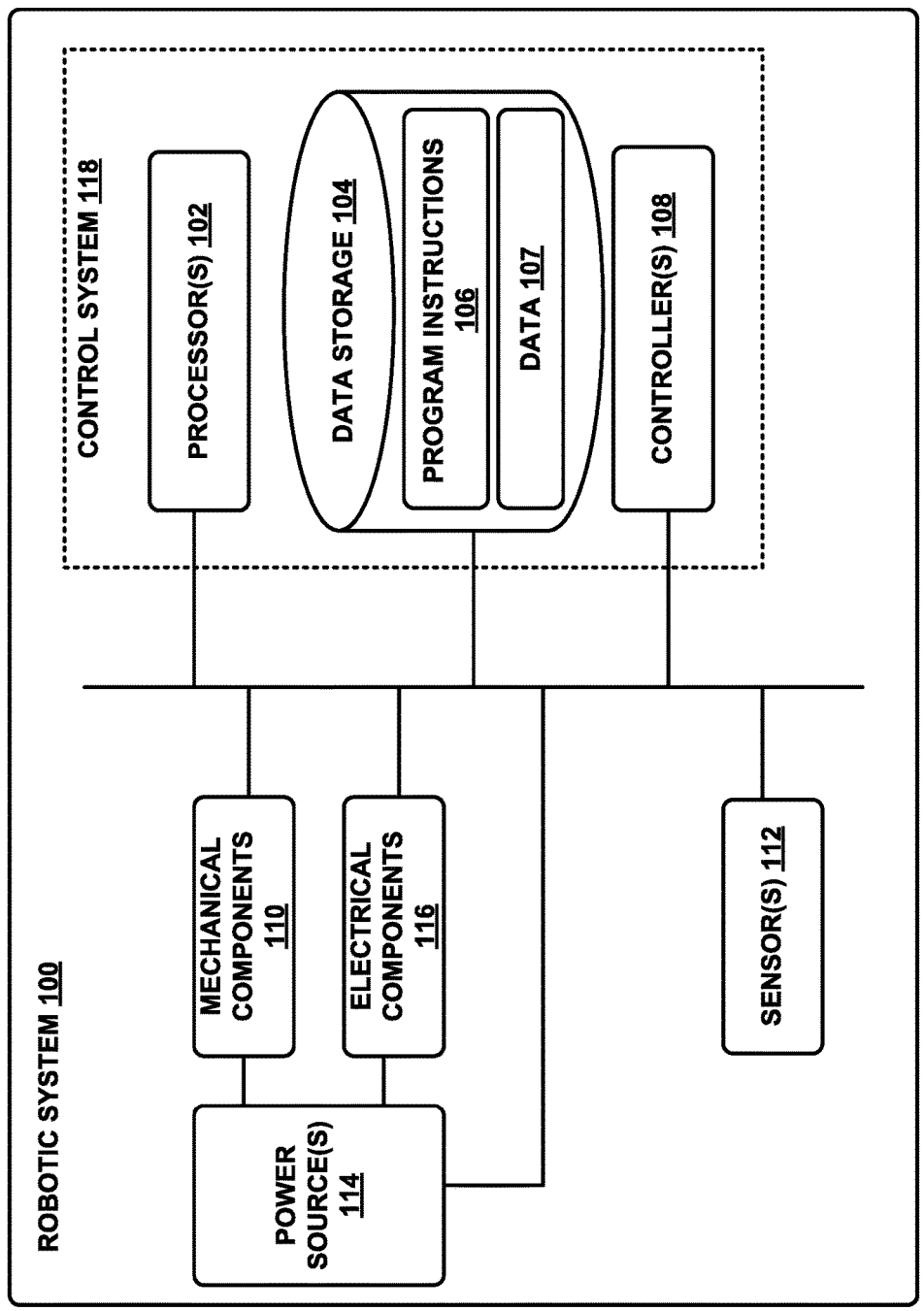
FIG. 1 illustrates a configuration of a robotic system, in accordance with an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication.

As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
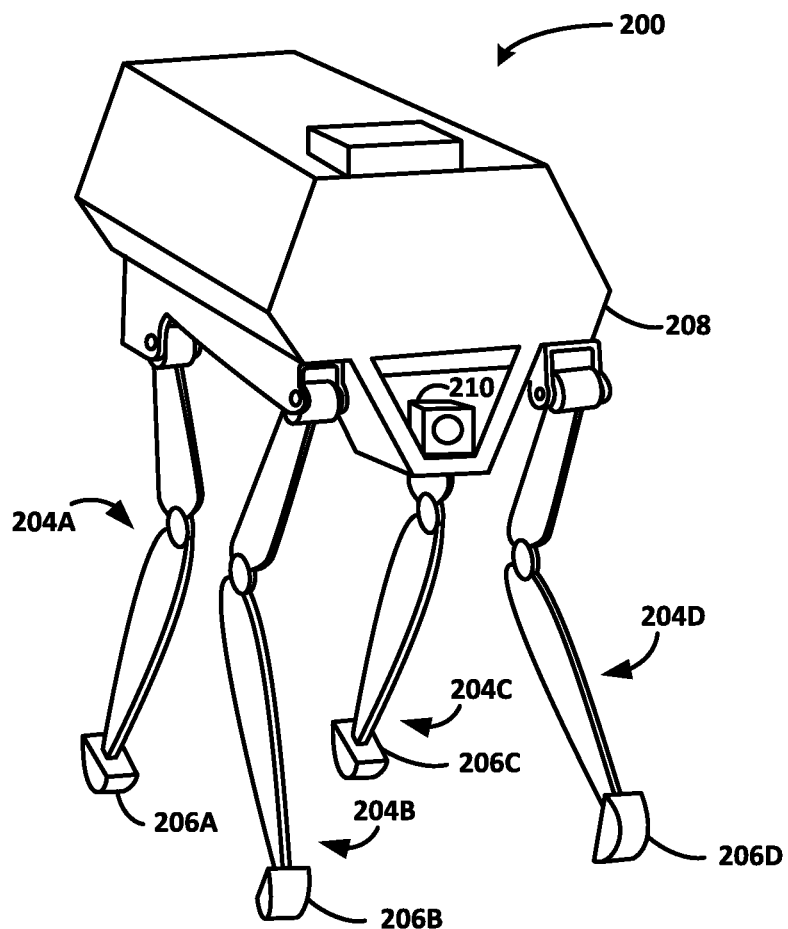
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
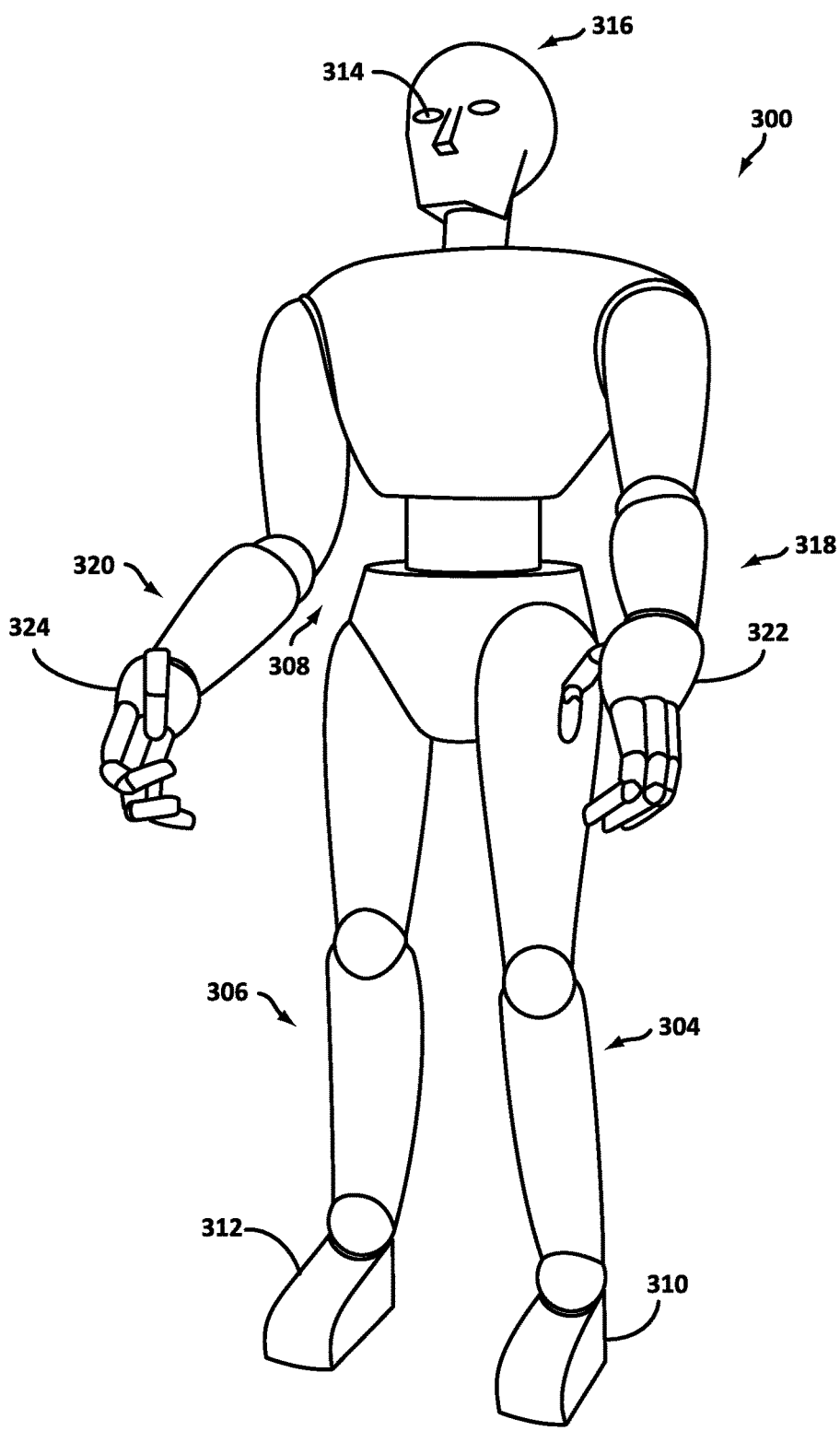
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

II. Example Robotic Members Controlled by Hydraulic Actuators and Valves

Figure 4A:
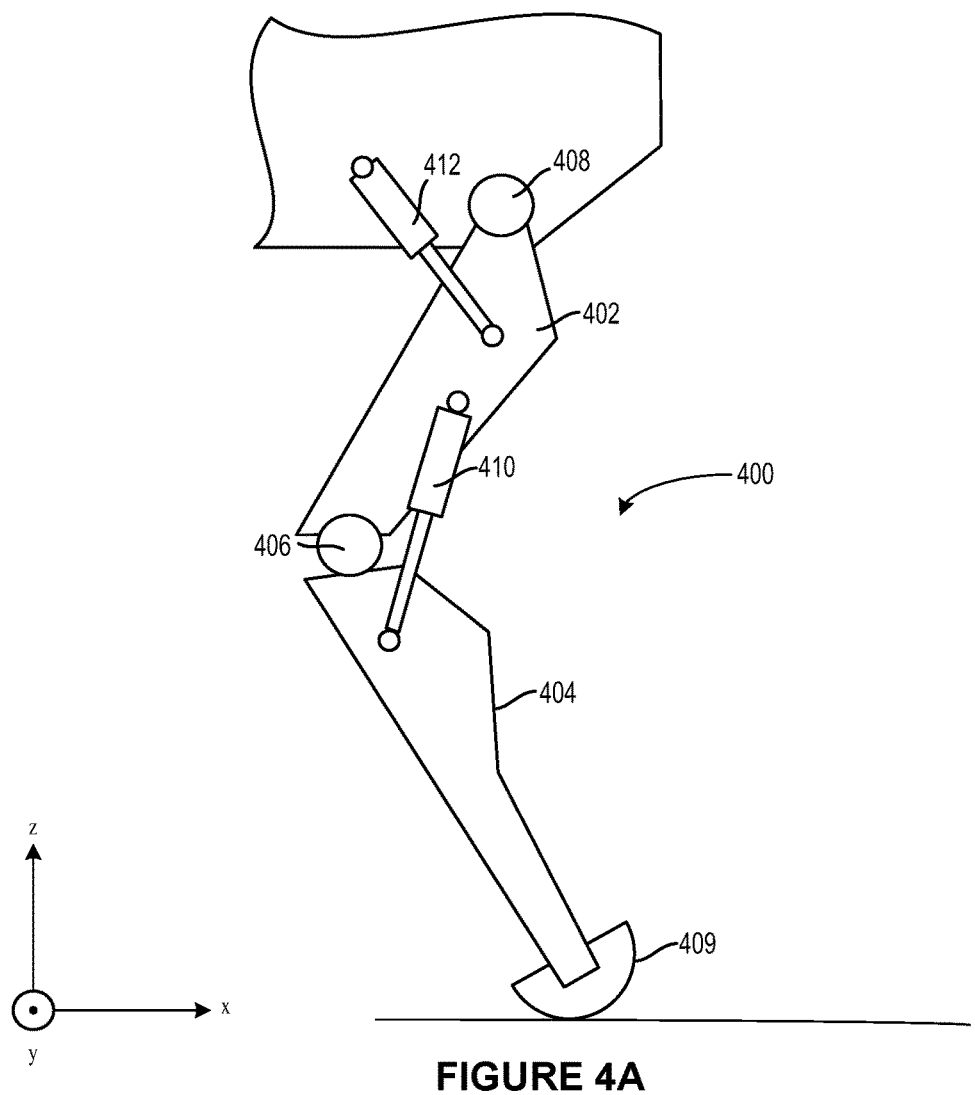
FIG. 4A is a side-view of an articulable robotic leg, in accordance with an example implementation.

FIG. 4A is a side-view of an articulable robotic leg 400, in accordance with an example implementation. The robotic leg 400 includes a member 402 and a member 404. The member 402 has an outboard end that is connected in a rotatable manner to an inboard end of the member 404 at a joint 406. The member 402 has an inboard end that is connected to the robot at joint 408. The member 404 has an outboard end that is connected to a foot member 409. The foot member 409 is depicted in FIG. 4A to be similar to the feet 206A-206D of the robot 200. However, this description applies to other types of feet such as the feet 310 and 312 of the robot 300.

The robotic leg 400 also includes an actuator 410 connected between the member 402 and the member 404. The robotic leg 400 further includes an actuator 412 connected between the member 402 and the robot. In some implementations, the actuators 410 and 412 may be linear actuator cylinders. Operating the actuator 412 causes the member 402 and the member 404 to rotate around joint 408. Similarly, actuation of the actuator 410 causes the member 404 to rotate around the joint 406.

Operating the actuator 410 and the actuator 412 in combination may cause the leg 400 to take a step. For instance, the actuator 410 may retract, which causes member 404 to rotate counter-clockwise (from the perspective shown in FIG. 4A) around the joint 406. This rotation may raise the leg 400 up from the ground. The actuator 412 may retract, which causes the member 402 to rotate clockwise (from the perspective shown in FIG. 4A) around the joint 408. By rotating the member 402 clockwise around the joint 408, the foot member 409 moves forward relative to the ground. The actuators 410 and 412 may then extend and cause the robotic leg 400 to be lowered and push against the ground, causing the robot to move forward or to adopt a new stance.

Although the side-view of the robotic leg in FIG. 4A is shown with the two actuators 410 and 412 that move the robotic leg 400 in two dimensions, the robotic leg 400 may have any number of actuators that allow for more or fewer degrees of freedom. In some cases, the robotic leg 400 may include actuators that allow for lateral movement of the robotic leg 400 (i.e., in and out of the page in the y-direction) in addition to longitudinal movement (i.e., in the x-direction depicted in FIG. 4A) and vertical movement (i.e., in the z-direction depicted in FIG. 4A).

Figure 4B:
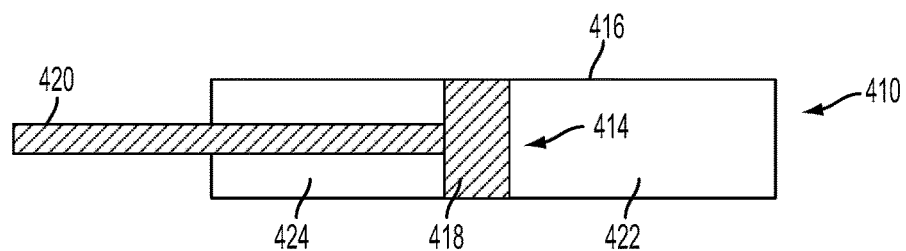
FIG. 4B illustrates an actuator, in accordance with an example implementation.

FIG. 4B illustrates the actuator 410, in accordance with an example implementation. The actuator 410 includes a piston 414 slidably accommodated within a cylinder 416 of the actuator 410. The piston 414 includes a piston head 418 and a rod 420 extending from the piston head 418 along a central axis direction of the actuator 410. The rod 420 is thus coupled to the member 404 shown in FIG. 4A. The piston head 418 divides the inside of the cylinder 416 into two chambers, 422 and 424.

The actuator 412 may be similar to or different from the actuator 410. Although the actuator 410 is depicted as a double-acting cylinder, single acting cylinders and other configurations of actuators are contemplated. Also, hydraulic motors rather than linear actuators are contemplated herein. The actuator configuration shown in FIG. 4B is an example for illustration to describe operation of the valve depicted in FIGS. 5A-5H.

The robot having the robotic leg 400 may include a hydraulic system that operates the actuators 410 and 412. Various types of valves could be used to control hydraulic fluid flow to and from the actuators 410 and 412. In one example, a four-way directional valve having a spool that is linearly displaceable within a body of the valve could be used. In examples, the spool can be relatively heavy, which negatively affects (i.e., increases) response time of the valve (i.e., the amount of time it takes the spool to respond to a command to move to a particular position).

Further, to include other modes of operation such as brake or regenerative modes where both chambers a hydraulic actuator are connected together through either the supply line or the return line, a length of the spool may be increased. An increase of the length of the spool may cause a size of the valve to increase, and may further affect (e.g., further increase) the response time of the valve. Further, such a spool valve can be inefficient as the valve may consume high-pressure hydraulic fluid when the hydraulic actuator performs negative work (e.g., lowering a weight with gravity assistance).

In another example, rotary valves having a spool that is rotatable, as opposed to a spool that is linearly displaceable, within the valve can enhance response time and efficiency of the robot.

In some examples, multiple valves of a robot are controlled by a centralized controller. The controller is connected to the valves by electrical connections, and in some instances, the controller is located at a central location on the robot far from the valves they control. Further, joints of the robot, such as the join 406, may have rotary position sensor (e.g., rotary encoders). These sensors may provide rotary position signals to the controller. Additionally, pressure sensors may be coupled to chambers of the hydraulic actuator and electrically connected to the controller. The controller may provide actuation signals to the valves based on these rotary position signals and pressure sensor signals. Thus, many electrical wires could be connecting the valves and sensors to a controller located at a central location in the robot.

As electrical connections get longer to reach from the valve and joints to the controller, the connections may pass through joints or other moving parts in the mechanical device, thus increasing the chance that a connection may be damaged. In addition, the connections may pass through components that produce radiation, potentially altering the accuracy of the electric signals going to the controller.

Thus, a valve with a controller coupled thereto is desirable because such configuration could reduce complexity of wiring and enhances modularity of the robot design. In one example, the controller is integrated with and housed into the valve. Pressure sensors are placed within the valve and connected to the controller via electrical connections that are also located within the valve. In some cases, the controller may be dedicated to controlling a single valve. Accordingly, each valve and controller could be dedicated to locally controlling an actuator or a joint of the robot. Having valve controllers separate from a main controller offloads some operations from the main controller and reduces network traffic between the main controller and other controllers and sensors.

Disclosed herein is a rotary valve with a controller integrated thereto and configured to control operation of an actuator such as the actuators 410 and 412.

III. Example Rotary Valve

Figure 5A:
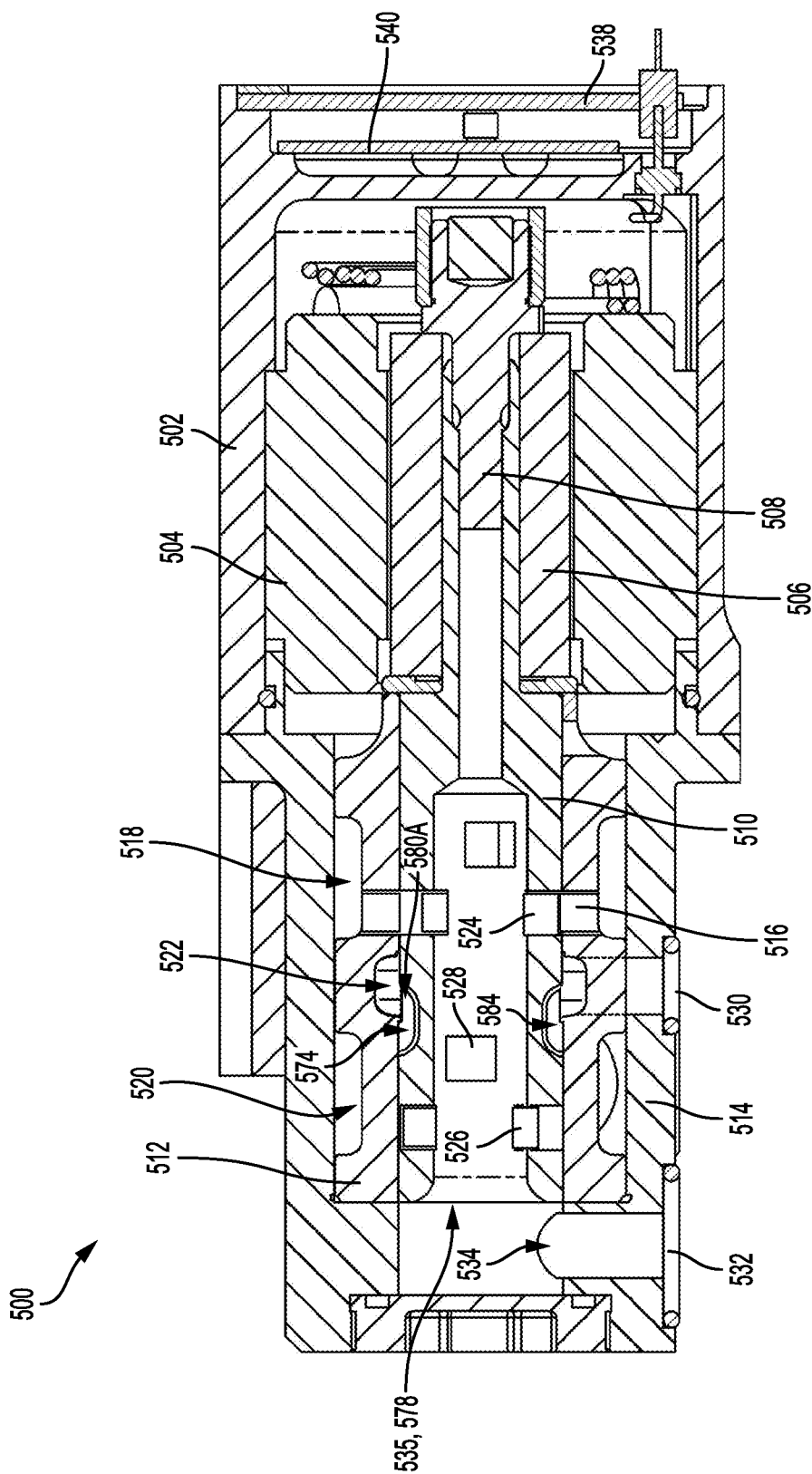
FIG. 5A illustrates a cross section of a rotary valve, in accordance with an example implementation.

FIG. 5A illustrates a cross section of a rotary valve 500, in accordance with an example implementation. The rotary valve 500 includes an end cap 502 that houses a rotary actuator such as a brushless direct current (DC) motor including a stator 504 and a rotor 506. A rotor bolt 508 is coupled to and configured to rotate with the rotor 506. A spool 510 is coupled to the rotor bolt 508 and configured to rotate with the rotor 506. The spool 510 is rotatable within a sleeve 512. The spool sleeve 512 is disposed within a valve body or manifold 514.

The sleeve 512 has a plurality of openings 516 configured along a length of the sleeve 512. The sleeve openings may be disposed in annular grooves such as annular grooves 518, 520, and 522. The sleeve openings may be arranged axially along the sleeve 512.

The spool 510 includes a respective plurality of openings along a length of the spool 510 corresponding to the plurality of openings of the sleeve 512. For instance, the spool 510 has an opening 524 that corresponds to the opening 516 of the sleeve 512. The spool 510 has other openings also such as openings 526 and 528, among others.

The manifold 514 has openings or ports that correspond to the openings and annular grooves of the sleeve 512. For example, the manifold 514 has inlet port 530 that is configured to be hydraulically coupled to a source of pressurized fluid (e.g., a pump or an accumulator coupled to the robot). The manifold 514 also has a return port 532 that is configured to be hydraulically coupled to a low pressure fluid reservoir or tank having fluid at a pressure lower than the pressure of the pressurized fluid.

Figure 5B:
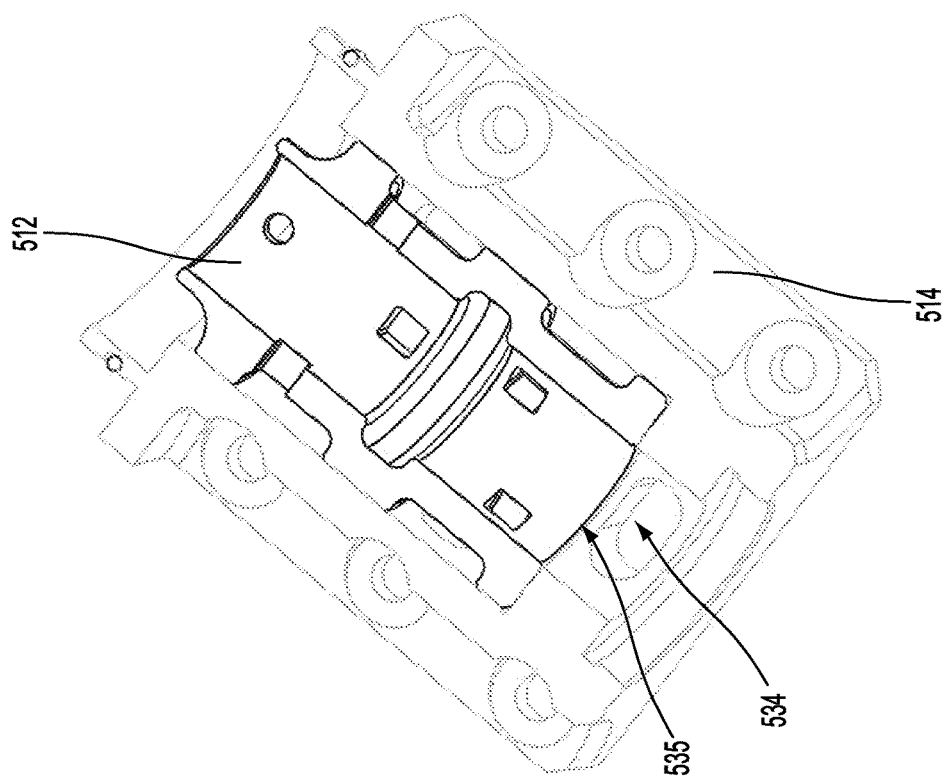
FIG. 5B illustrates a partial perspective view of a sleeve disposed within a manifold, in accordance with an example implementation.

FIG. 5B illustrates a partial perspective view of the sleeve 512 disposed within the manifold 514, in accordance with an example implementation. As shown in FIG. 5B, the manifold 514 includes an opening 534. Fluid received inside the spool 510, as explained below, is communicated through an opening at an end of the spool 510, an opening 535 at an end of the sleeve 512, the opening 534, and the return port 532 to the reservoir.

Figure 5C:
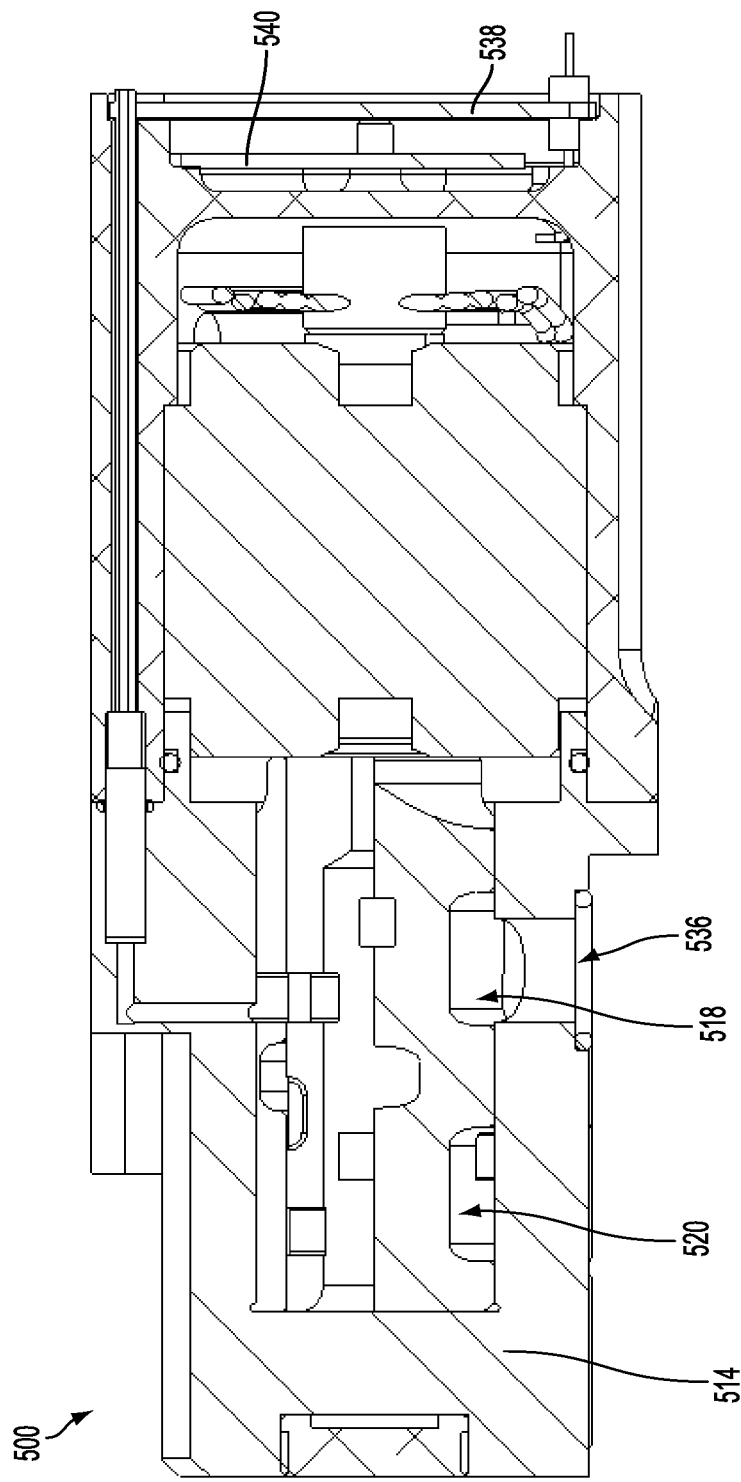
FIG. 5C illustrates a cross section of a valve, in accordance with an example implementation.

Further, the manifold 514 also has work ports that are hydraulically coupled to the annular groove 518 and 520. FIG. 5C illustrates a cross section of the valve 500, in accordance with an example implementation. As shown in FIG. 5C, a work port 536 disposed in the manifold 514 communicates fluid to and from the annular groove 518. A similar work port, not shown in FIG. 5C, communicates fluid to and from the annular groove 520. These work ports are also configured to be hydraulically coupled to chambers of the actuator of the robot, e.g., the chambers 422 and 424 of the actuator 410. For instance, the work port 536 may be hydraulically coupled to the chamber 422 of the actuator 410. Thus, the annular groove 518 may be hydraulically coupled through the work port 536 to the chamber 422. Similarly, the annular groove 520 may be hydraulically coupled through another work port in the manifold 514 to the chamber 424. In the following description, it is assumed that the chamber 422 is hydraulically coupled to the annular groove 518 through the work port 536, and the chamber 424 is hydraulically coupled to the annular groove 520 through another work port in the manifold. This configuration is an example for illustration, and other configurations are possible.

As shown in FIGS. 5A and 5C, the valve 500 also has a controller 538 coupled and integrated to the end cap 502. However, the controller 538 could be disposed in other parts of the valve 500. A rotary position sensor (e.g., rotary encoder) 540 is coupled to the spool 510 and is configured to provide spool rotary position signal to the controller 538 to indicate a rotary position of the spool 510 within the sleeve 512.

Figure 5D:
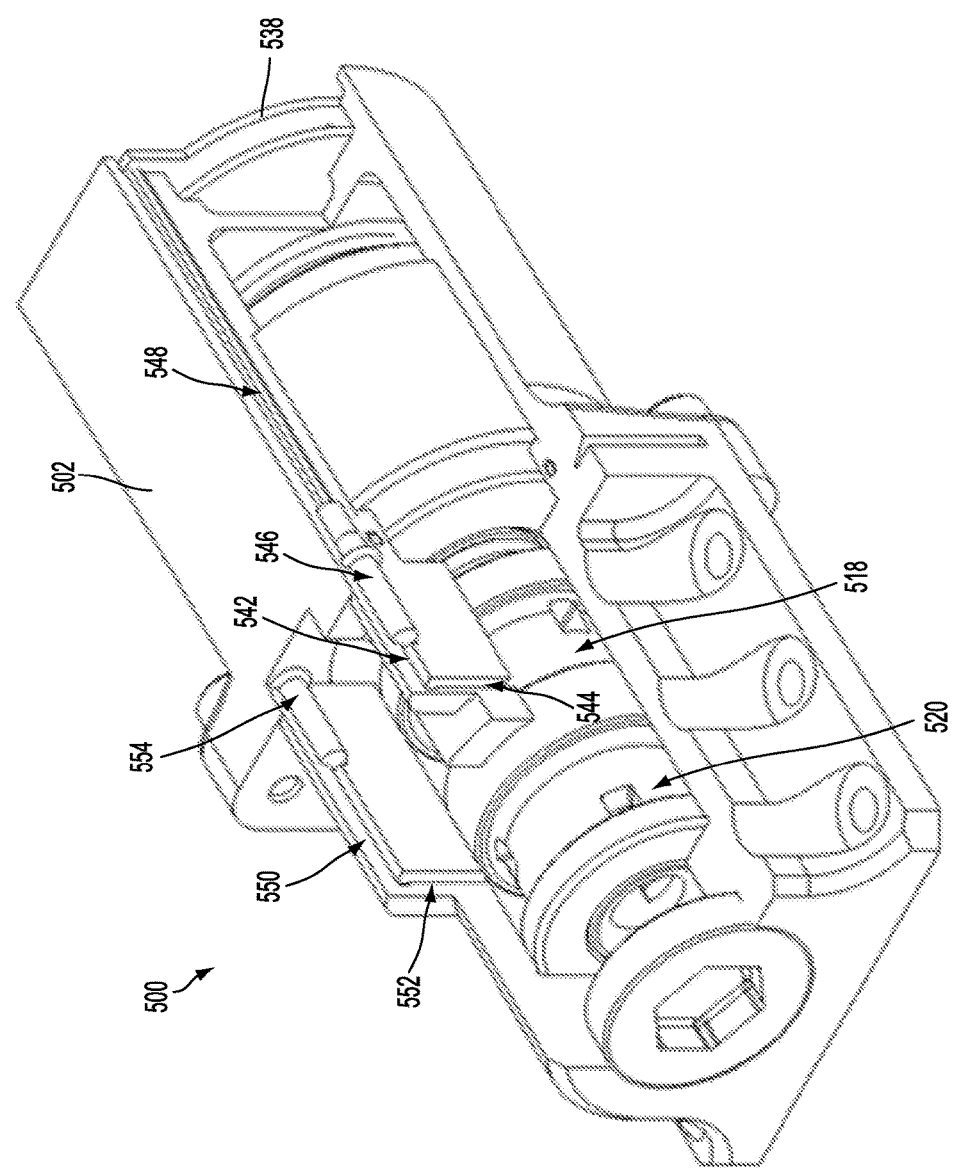
FIG. 5D illustrates a perspective partial view of a valve, in accordance with an example implementation.

FIG. 5D illustrates a perspective partial view of the valve 500, in accordance with an example implementation. As shown in FIG. 5C, the valve 500 has a conduit 542 that is hydraulically connected with the annular groove 518 by way of a channel 544. A pressure sensor 546 is disposed in the conduit 542. The pressure sensor 546 is thus configured to measure a pressure level of fluid in the chamber 422, because the chamber 422 is hydraulically connected to the annular groove 518 by way of the work port 536. Cables or electric wires 548 electrically connect the pressure sensor 546 to the controller 538. The wires 548 emanate from the pressure sensor 546 and are fed through the conduit 542 to be connected to the controller 538.

Similarly, the valve 500 has a conduit 550 that is hydraulically connected with the annular groove 520 by way of a channel 552. A pressure sensor 554 is disposed in the conduit 550. The pressure sensor 554 is thus configured to measure a pressure level of fluid in the chamber 424, as the chamber 424 is hydraulically connected to the annular groove 520 by way of a work port in the manifold 514. The controller 538 may thus estimate the force F applied to or by the actuator 410 using the following equation:

$$F = P_{C1}A_1 - P_{C2}A_2 \qquad (1)$$

where $P_{C1}$ is the fluid pressure in the chamber 422 applied to piston area $A_1$ in the chamber 422 and $P_{C2}$ is the fluid pressure applied to piston area $A_2$ in the chamber 424. The pressure sensors 546 and 554 may be of any type of pressure sensors. As an example, the pressure sensors may include a strain gauge disposed on walls of their respective conduits.

Figure 5E:
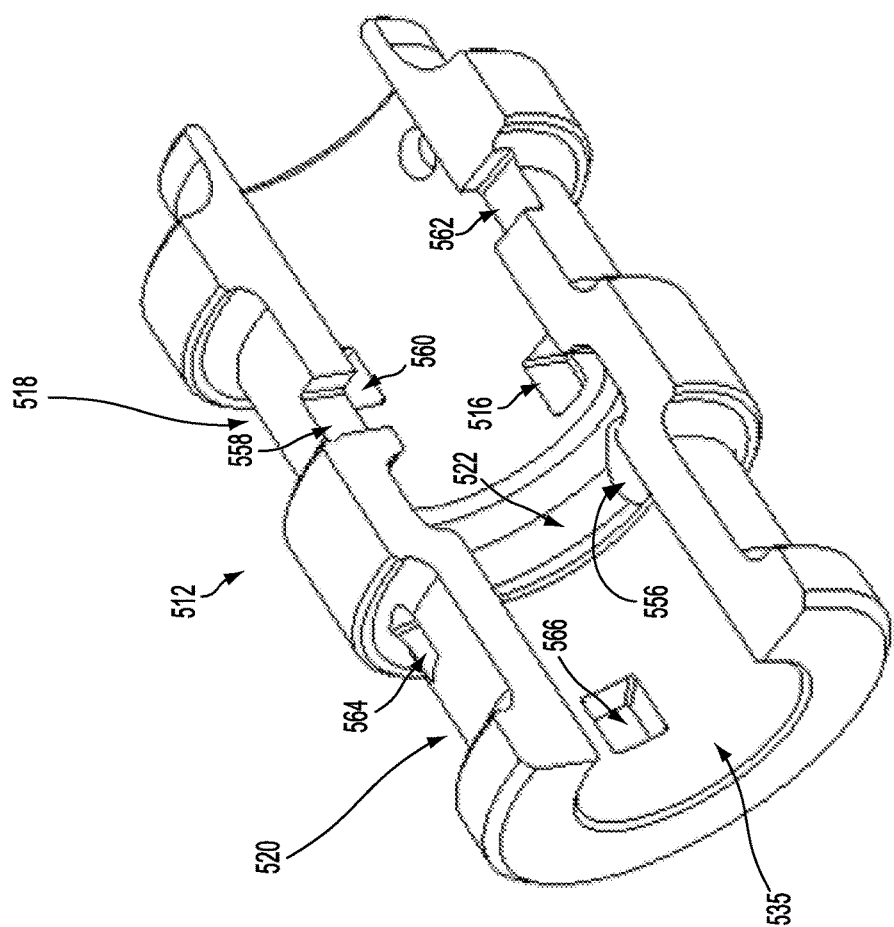
FIG. 5E illustrates a perspective view of a cross section of a sleeve, in accordance with an example implementation.

FIG. 5E illustrates a perspective view of a cross section of the sleeve 512, in accordance with an example implementation. As shown in FIG. 5E, the sleeve 512 includes an opening 556 disposed in the annular groove 522. The opening 556 is in fluid communication and is aligned with the inlet port 530 of the manifold 514. The inlet port 530 is configured to receive pressurized fluid from a supply line connected to a source of pressurized fluid, and fluid is then communicated through the opening 556 to the annular groove 522.

In addition to the opening 516 disposed in the annular groove 518, the sleeve 512 includes openings 558, 560, and 562 also disposed in the annular groove 518. The openings 516, 558, 560, and 562 are configured to communicate fluid through the annular groove 518 and the work port 536 to and from the chamber 422 of the actuator 410.

Similarly, the sleeve 512 includes openings 564 and 566 disposed in the annular groove 520. The openings 564 and 566 are configured to communicate fluid through the annular groove 520 and a work port in the manifold 514 to and from the chamber 424 of the actuator 410.

The sleeve openings disposed in the annular grooves 518 and 520 may be disposed in a circular array along a circumference of the sleeve 512. For example, a number of N openings 562 may be disposed along the circumference of the sleeve 512 spaced 360°/N apart from each other. However, in other examples, the openings 562 might not be evenly spaced. The term "circular array" is used herein to include both evenly spaced and unevenly spaced openings configurations. If the openings are evenly spaced, the openings form an array of openings that balances radial pressure forces acting on the spool 510 disposed within the sleeve 512, and thus reduces friction that the spool 510 experiences as it rotates within the sleeve 512. Each of the other openings, 516, 558, 560, 564, and 566 may also have corresponding openings disposed along the circumference of the sleeve 512.

Figure 5F:
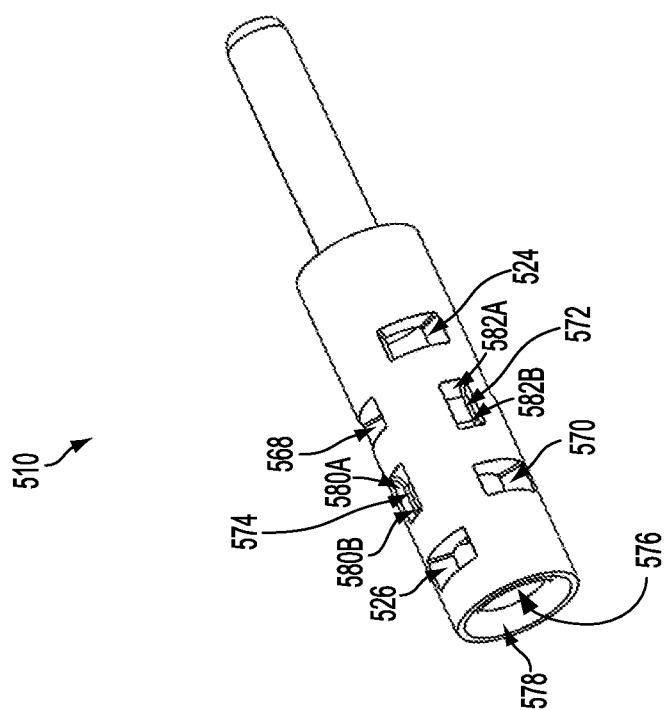
FIG. 5F illustrates a perspective view of a spool, in accordance with an example implementation.

FIG. 5F illustrates a perspective view of the spool 510, in accordance with an example implementation. As shown in FIG. 5F, the spool 510 has windows and openings that correspond to the openings of the sleeve 512. In addition to the openings 524 and 526, the spool 510 includes other openings such as the openings 568, 570, 572, and 574.

The spool 510 is hollow and has an internal chamber 576. Thus, fluid in the internal chamber 576 could be communicated through an opening 578 at an end of the spool 510, the opening 535 of the sleeve 512, the opening 534, and the return port 532 to the reservoir.

Further, the openings 524, 526, 568, and 570 are through-hole windows that extend to the internal chamber 576, whereas the openings 572 and 574 are not through-holes and do not extend to the internal chamber 576. The openings 572 and 574 are thus blind openings, and can be referred to as axial grooves.

The opening 574 has a first end 580A and a second end 580B. Similarly, the opening 572 has a first end 582A and a second end 582B. When the spool 510 is disposed within the sleeve 512, the annular groove 522 of the sleeve 512 overlaps the first end 580A of the opening 574, and overlaps the second end 582B of the opening 572. For example, FIG. 5A illustrates the annular groove 522 overlapping the first end 580A of the opening 574. In this configuration, the openings 572 and 574 contain, or have access to, pressurized fluid received through the inlet port 530, the opening 556, and the annular groove 522.

The spool openings may be disposed in a circular array along a circumference of the spool 510. For example, a number of N openings 524 may be disposed along the circumference of the sleeve 510 spaced 360°/N apart from each other. However, in other examples, the openings 524 might not be evenly spaced. If the openings are evenly spaced, the openings form an array of openings that balances radial pressure forces acting on the spool 510, and thus reduces friction that the spool 510 experiences as it rotates within the sleeve 512. Each of the other openings, 526, 568, 570, 572, and 574 may also have corresponding openings disposed along the circumference of the spool 510.

Figure 5G:
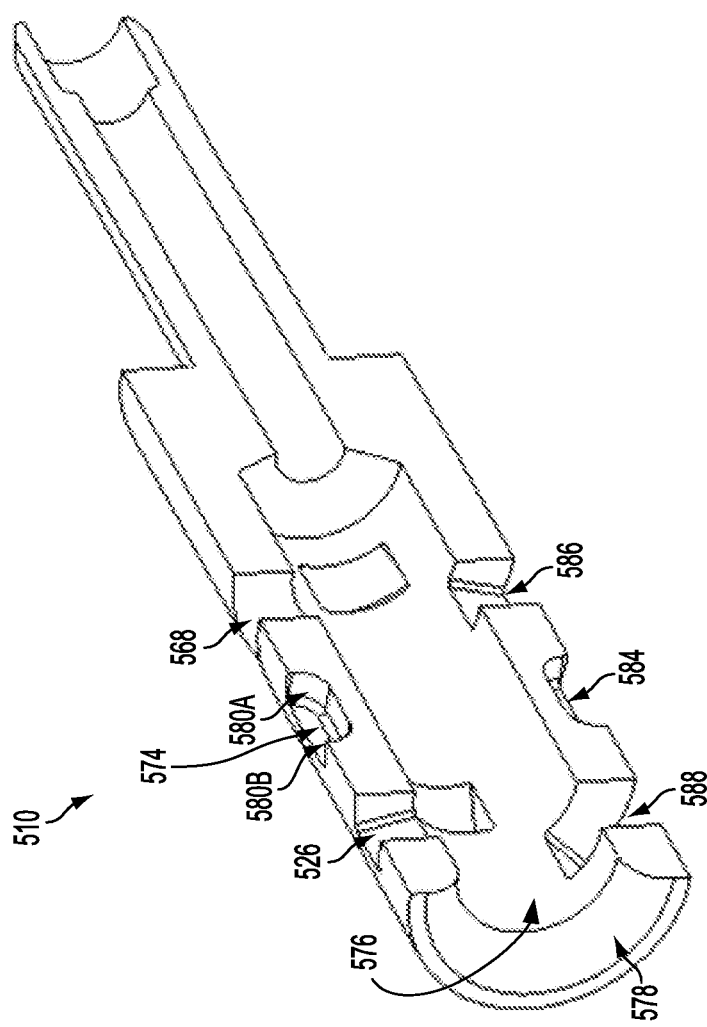
FIG. 5G illustrates a perspective view of a cross section of the spool, in accordance with an example implementation.

FIG. 5G illustrates a perspective view of a cross section of the spool 510, in accordance with an example implementation. As shown in FIG. 5G the opening 574 has a corresponding opening 584 on the other side of the spool 510, the opening 568 has a corresponding opening 586, and the opening 526 has a corresponding opening 588.

Figure 5H:
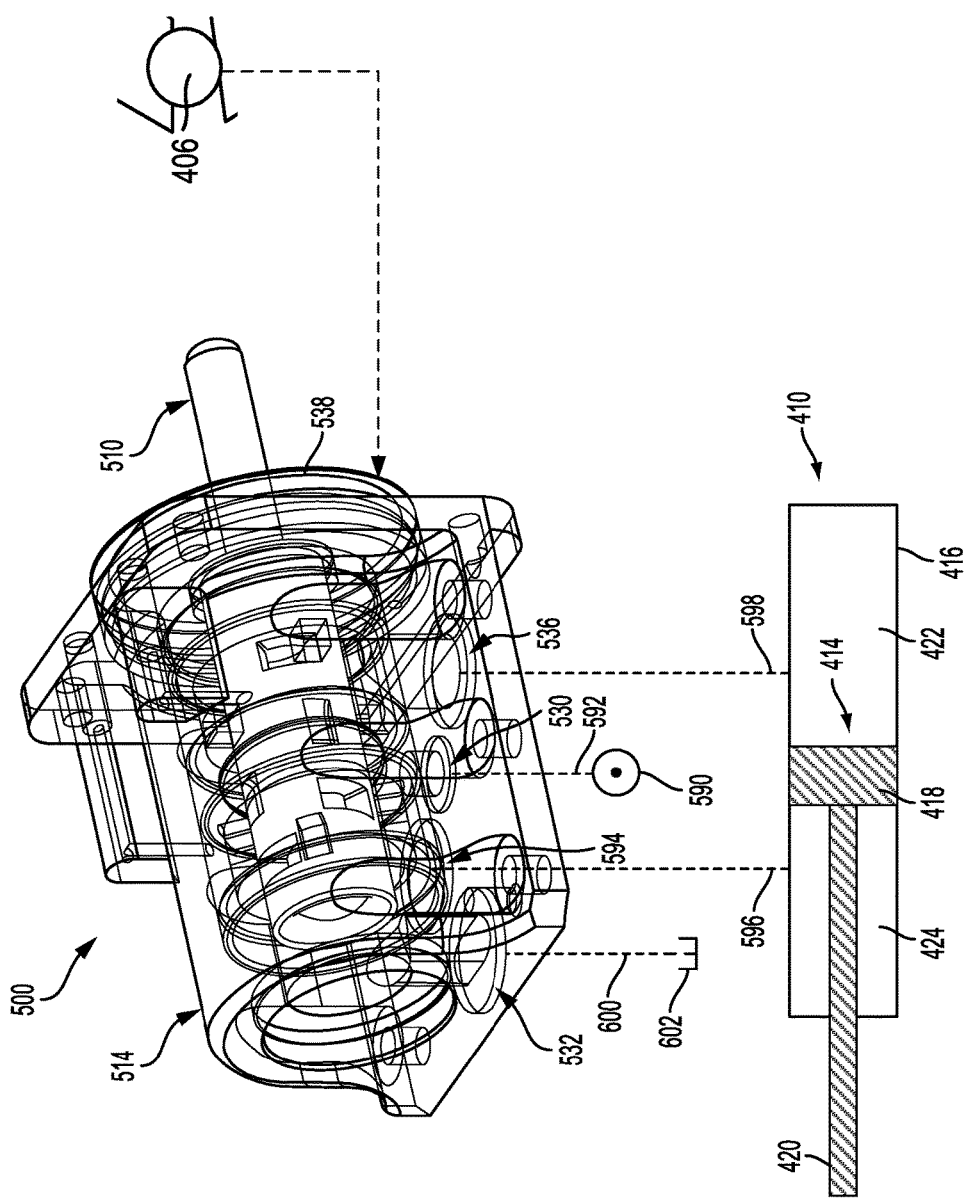
FIG. 5H illustrates a schematic of a valve connected to the actuator illustrated in FIG. 4B, in accordance with an example implementation.

FIG. 5H illustrates a schematic of the valve 500 connected to the actuator 410, in accordance with an example implementation. The valve 500 is depicted as transparent in FIG. 5H to illustrate inside details of the valve 500.

The rotary actuator (e.g., motor) coupled to the spool 510 may be configured to rotate the spool 510 within the sleeve 512 in a clockwise or a counter-clockwise direction. Rotating the spool 510 to a given position or angle may cause at least a partial alignment between the openings of the spool 510 with the openings of the sleeve 512.

For example, at a first rotary position of the spool 510 within the sleeve 512 as shown in FIG. 5H, the second end 580B of the opening 574 of the spool 510 may be at least partially aligned with the opening 564 of the sleeve 512. The first end 582A of the opening 572, however, is not aligned with a respective sleeve opening and any fluid communicated to the opening 572 is thus blocked. Thus, fluid received from a source 590 of pressurized fluid through a supply line 592, the inlet port 530, the opening 556, and the annular groove 522 enters the opening 574 through the first end 580A. Fluid entering the opening 574 through the first end 580A is then communicated through the second end 580B and the opening 564 to the annular groove 520. Fluid in the annular groove 520 is then communicated through a work port 594 in the manifold 514 and hydraulic line 596 to the chamber 424 of the actuator 410, thus causing the piston 414 to retract (i.e., move right in FIG. 5H).

Also, at this first rotary position, spool openings, such as the openings 524 and 568, are at least partially aligned with corresponding sleeve openings, such as the openings 516, 558, 560, and 560. Thus, fluid discharged from the chamber 422 as the piston 414 retracts is communicated through hydraulic line 598 and the work port 536 to the annular groove 518. Fluid in the annular groove 518 is then communicated through the sleeve openings (e.g., the openings 516, 558, 560, and 560) and the spool opening (e.g., the openings 524 and 568) to the inside chamber 576 of the spool 510. Fluid in the chamber 576 is communicated through the opening 578 of the spool 510, the opening 535 of the sleeve, the opening 534, the return port 532, and hydraulic return line 600 to a reservoir or tank 602.

This first rotary position of the spool 510 is shown as an example for illustration only. The spool 510 can be rotated to an infinite number of rotary positions. For instance, at a second rotary position, the first end 582A of the opening 572 of the spool 510 may be at least partially aligned with the opening 516 (and the opening 558) of the sleeve 512. Thus, fluid received from the source 590 of pressurized fluid through the supply line 592, the inlet port 530, the opening 556, and the annular groove 522 enters the opening 572 through the second end 582B. Fluid is then communicated through the first end 582A and the opening 516 to the annular groove 518. Fluid in the annular groove 518 is then communicated through the work port 536 in the manifold 514 and the hydraulic line 598 to the chamber 422 of the actuator 410, thus causing the piston 414 to extend (i.e., move left in FIG. 5H).

Also, at this second rotary position, spool openings, such as the openings 526, 570, and 588, are at least partially aligned with corresponding sleeve openings disposed in the annular groove 520, such as the openings 564 and 566. Thus, fluid discharged from the chamber 424 as the piston 414 extends is communicated through the hydraulic line 596 and the work port 594 to the annular groove 520. Fluid in the annular groove 520 is then communicated through the sleeve openings (e.g., the openings 564 and 566) and the spool opening (e.g., the openings 526, 570, and 588) to the inside chamber 576 of the spool 510. Fluid in the chamber 576 is communicated through the opening 578 of the spool 510, the opening 535 of the sleeve 512, the opening 534, the return port 532, and the hydraulic return line 600 to the reservoir 602.

At other rotary positions of the spool 510, the valve 510 may enable regenerative configurations where both chambers 422 and 424 may be connected to the source 590 or to the reservoir 602.

In this manner, the rotary actuator of the valve 500 enables 360 degrees rotation of the spool 510 to any given position to selectively align a subset of openings of the sleeve with a subset of sleeve. Based on the rotary position of the spool 510 and which openings are aligned, the hydraulic actuator 410 may operate in a particular mode (e.g., extend, retract, etc.).

Also, based on the rotary position of the spool 510, an or amount of alignment (e.g., no alignment, partial alignment, full alignment, etc.) between the spool openings and the sleeve openings may be changed so as to meter fluid passing through aligned openings. By metering the fluid, motion of the hydraulic actuator 410 (speed, force, etc.) could be controlled. For instance, the controller 538 may receive a command to move the piston 414 at a given speed in a given direction and apply a particular force. The controller 538, in response, may provide a signal to the rotary actuator to rotate the spool 510 to a given position to control flow of fluid to and from the actuator 410 and thus control speed and direction of motion of the piston 414 and the force applied by the actuator 410.

The controller 538 determines the appropriate rotary position for the spool 510 to achieve the desired force and speed for the actuator 410 based on several inputs. The controller 538 receives from the first pressure sensor 546 and the second pressure sensor 554, pressure information indicative of the pressure level in the chambers 422 and 424, respectively. Also, as schematically shown in FIG. 5H, the controller 538 receives joint rotary position information from a joint rotary position sensor coupled to the joint 406 of the robot. Further, the controller 538 receives, from the rotary position sensor 540, spool rotary position information indicative of a current rotary position of the spool 510 within the sleeve 512. The controller may then use these inputs to determine a signal to provide to the rotary actuator to place the spool 510 at the appropriate rotary position that would achieve the desired force and speed. The controller may further implement a closed-loop control algorithm to accurately place the spool 510 at the appropriate rotary position based on feedback from the rotary position sensor 540.

IV. Example Methods

Figure 6:
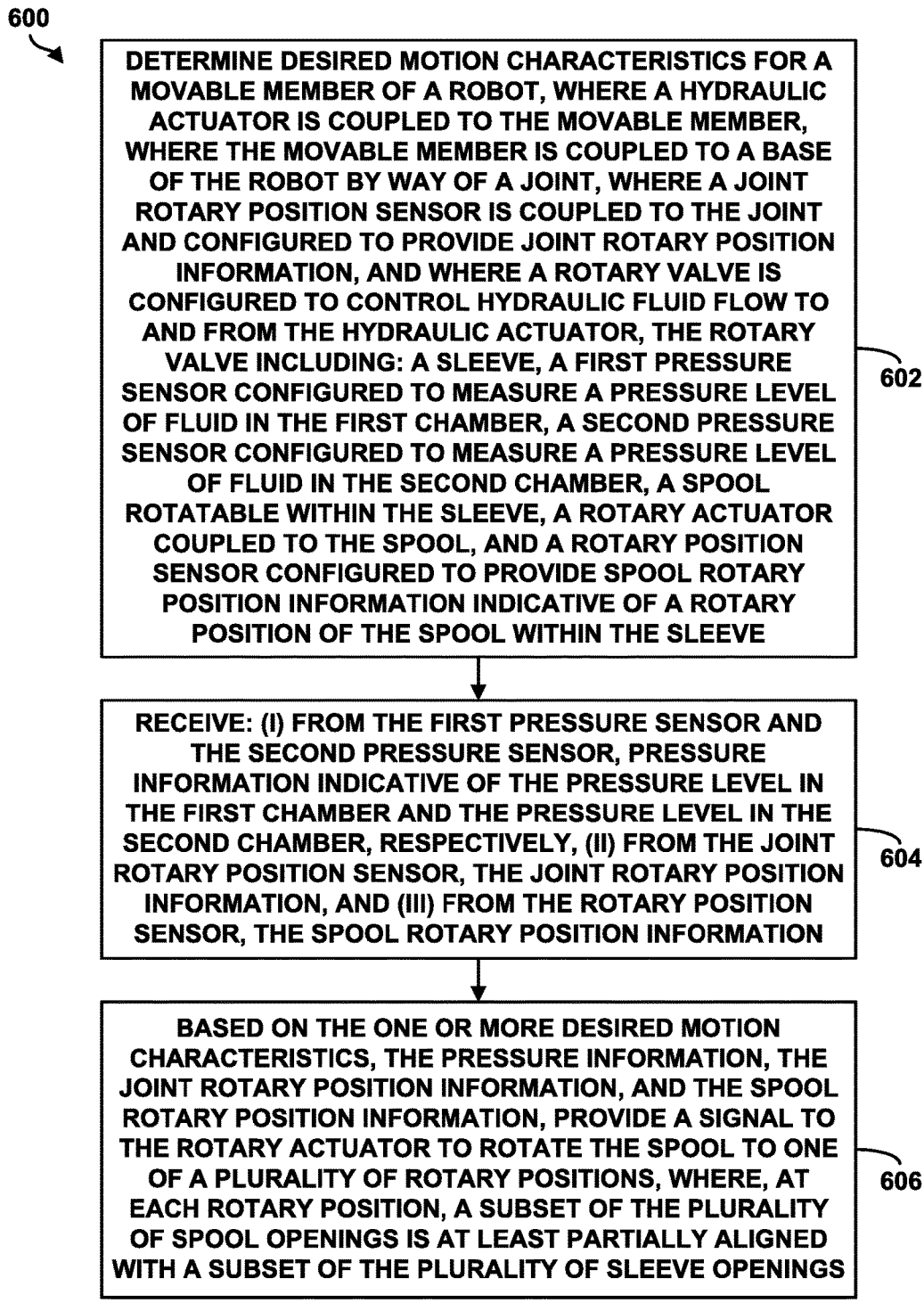
FIG. 6 is a flow chart, in accordance with an example implementation.

FIG. 6 is a flow chart 600 for controlling an actuator by way of a rotary valve having an integrated controller, in accordance with an example implementation. The flow chart 600 may include one or more operations, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 600 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 600 and other processes and operations disclosed herein, one or more blocks in FIG. 6 may represent circuitry or digital logic that is arranged to perform the specific logical operations in the process.

At block 602, the flow chart 600 includes determining one or more desired motion characteristics for a movable member of a robot. In line with the discussion above, a controller (e.g., the controller 108 or the controller 538) may determine one or more of a desired position, speed, and force for a hydraulic actuator such as the actuator 410. The hydraulic actuator is coupled to a movable member (e.g., the member 404) of the robot and configured to control motion of the movable member. The movable member is coupled to a base of the robot or to another member of the robot (e.g., the member 402) by way of a joint (e.g., the joint 406). A joint rotary position sensor is coupled to the joint and configured to provide joint rotary position information to the controller.

A rotary valve (e.g., the valve 500) is configured to control hydraulic fluid flow to and from the hydraulic actuator. The rotary valve includes a sleeve (e.g., the sleeve 512) having a plurality of sleeve openings (e.g., the openings 516, 535, 556, 558, 560, 562, 564, and 566). Particularly, the plurality of sleeve openings may include at least: (i) a first opening (e.g., the opening 556) configured to communicate fluid to and from a high pressure fluid source, (ii) a second opening (e.g., the opening 535) configured to communicate fluid to and from a low pressure fluid reservoir, (iii) a third opening (e.g., the openings 516, 558, 560, 562) configured to communicate fluid to and from the first chamber of the hydraulic actuator (by way of an annular groove such as the annular groove 518 and the work port 536), and (iv) a fourth opening (e.g., the openings 564, 566) configured to communicate fluid to and from the second chamber of the hydraulic actuator (by way of an annular groove such as the annular groove 520 and the work port 594).

The rotary valve also includes a first conduit (e.g., the conduit 542) configured to be in hydraulic communication with a first chamber (e.g., the chamber 422) of the hydraulic actuator. A first pressure sensor (e.g., the pressure sensor 546) is disposed in the first conduit and configured to measure a pressure level of fluid in the first chamber of the hydraulic actuator. The rotary valve also includes a second conduit (e.g., the conduit 550) configured to be in hydraulic communication with a second chamber (e.g., the chamber 424) of the hydraulic actuator. A second pressure sensor (e.g., the pressure sensor 554) is disposed in the second conduit and configured to measure a pressure level of fluid in the second chamber. The first and second pressure sensor may be of any type of pressure sensors. As an example, the pressure sensors may include a strain gauge disposed on a wall of their respective conduits.

The valve may include an end cap (e.g., the end cap 502) configured to house the rotary actuator and at least a portion of the spool. A controller (e.g., the controller 538) may be disposed in or integrated into the end cap. Electric wires may emanate from the first and second pressure sensors, and may be fed through their respective conduits to be connected to the controller disposed in the end cap.

The rotary valve further includes a spool (the spool 510) rotatable within the sleeve. The spool includes a plurality of openings (e.g., 524, 526, 568, 570, 572, 574, and 578) respectively corresponding to the plurality of sleeve openings. The spool may also include an internal chamber (the internal chamber 576). Fluid may pass through a given opening (e.g., the opening 526) in the spool through the internal chamber to the second opening (e.g., the opening 535) of the plurality of sleeve openings to the low pressure fluid reservoir.

The rotary valve also includes a rotary actuator coupled to the spool and configured to rotate the spool within the sleeve in clockwise and counter-clockwise directions. The rotary valve further includes rotary position sensor (e.g., the rotary position sensor 540) configured to provide spool rotary position information indicative of a rotary position of the spool within the sleeve.

At block 604, the flow chart 600 includes receiving: (i) from the first pressure sensor and the second pressure sensor, pressure information indicative of the pressure level in the first chamber and the pressure level in the second chamber, respectively, (ii) from the joint rotary position sensor, the joint rotary position information, and (iii) from the rotary position sensor, the spool rotary position information. As discussed above, the controller receives sensor information from the first pressure sensor, the second pressure sensor, the joint rotary position sensor, and the spool rotary position sensor. The controller may thus determine a current position of the joint, a current position of the spool within the sleeve, and a current force being applied or experienced by the actuator (see equation 1).

At block 606, the flow chart 600 includes, based on the one or more desired motion characteristics, the pressure information, the joint rotary position information, and the spool rotary position information, providing a signal to the rotary actuator to rotate the spool to one of a plurality of rotary positions, wherein, at each rotary position, a subset of the plurality of spool openings is at least partially aligned with a subset of the plurality of sleeve openings.

Based on the desired motion characteristics for the movable member (e.g., speed and force), the current force of the actuator, the joint rotary position information, and the spool rotary position information, the controller may determine a desired rotary spool position. The controller determines the desired rotary spool position so as to align, at least partially, a subset of sleeve openings with a corresponding subset of spool openings. Such alignment between the sleeve openings and the spool openings determines flow paths between the valve and the actuator. Further, a degree of alignment or overlap between the sleeve openings and the spool openings determine metering of fluid passing through the aligned openings to and from the actuator. Thus, the rotary position of the spool within the sleeve controls speed and force of the actuator.

V. Conclusion

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:
1. A robot comprising:
   at least one movable member;
   a hydraulic actuator coupled to the movable member and configured to control motion of the movable member, wherein the motion of the movable member includes one or more of position, speed, and force of the movable member;

a rotary valve configured to control hydraulic fluid flow to and from the hydraulic actuator, the rotary valve comprising:
  a sleeve having a plurality of sleeve openings, wherein the plurality of sleeve openings include at least: a first opening configured to communicate fluid to and from a high pressure fluid source, a second opening configured to communicate fluid to and from a low pressure fluid reservoir, a third opening configured to communicate fluid to and from a first chamber of the hydraulic actuator, and a fourth opening configured to communicate fluid to and from a second chamber of the hydraulic actuator,
  a first conduit configured to be in hydraulic communication with the first chamber, wherein a first pressure sensor is disposed in the first conduit and configured to measure a pressure level of fluid in the first chamber,
  a second conduit configured to be in hydraulic communication with the second chamber, wherein a second pressure sensor is disposed in the second conduit and configured to measure a pressure level of fluid in the second chamber,
  a spool rotatable within the sleeve, wherein the spool includes a plurality of spool openings respectively corresponding to the plurality of sleeve openings,
  a rotary actuator coupled to the spool and configured to rotate the spool within the sleeve in clockwise and counter-clockwise directions, and
  an end cap configured to house the rotary actuator and at least a portion of the spool; and
a controller disposed in the end cap and configured to perform operations comprising:
  determining one or more desired motion characteristics for the movable member,
  receiving, from the first pressure sensor and the second pressure sensor, pressure information indicative of the pressure level in the first chamber and the pressure level in the second chamber, respectively, and
  based on the one or more desired motion characteristics and the pressure information, providing a signal to the rotary actuator to rotate the spool to one of a plurality of rotary positions, wherein, at each rotary position, a subset of the plurality of spool openings is at least partially aligned with a subset of the plurality of sleeve openings, to hydraulically connect (i) the first chamber to either the high pressure fluid source or the low pressure fluid reservoir, and (ii) the second chamber to either the high pressure fluid source or the low pressure fluid reservoir.

2. The robot of claim 1, wherein:
the movable member is coupled to a base, or another member, of the robot by way of a joint,
a joint rotary position sensor is coupled to the joint and configured to provide joint rotary position information,
the rotary valve further includes a rotary position sensor configured to provide to the controller spool rotary position information indicative of a rotary position of the spool within the sleeve, and
providing the signal to the rotary actuator is further based on the spool rotary position information and the joint rotary position information.

3. The robot of claim 1,
wherein the third opening of the sleeve is disposed in a first annular groove in the sleeve, wherein the first annular groove is configured to communicate fluid to and from a first work port disposed in a manifold within which the sleeve is disposed, wherein the first work port is hydraulically connected to the first chamber of the hydraulic actuator, and
wherein the fourth opening of the sleeve is disposed in a second annular groove in the sleeve, wherein the second annular groove is configured to communicate fluid to and from a second work port disposed in the manifold, wherein the second work port is hydraulically connected to the second chamber of the hydraulic actuator.

4. The robot claim 1, wherein the first pressure sensor comprises a strain gauge disposed on a wall of the first conduit.

5. The robot of claim 1, wherein the spool includes an internal chamber, and wherein the rotary valve is configured such that fluid passes through a given opening of the respective plurality of openings of the spool through the internal chamber to the second opening of the plurality of openings of the sleeve to the low pressure fluid reservoir.

* * * * *